United States Patent
Drion et al.

(10) Patent No.: US 10,187,487 B2
(45) Date of Patent: Jan. 22, 2019

(54) INFRASTRUCTURE FOR HOSTING SERVICES IN AN AIRCRAFT, AND RELATED ACCESS METHOD

(71) Applicant: DASSAULT AVIATION, Paris (FR)

(72) Inventors: Adrien Drion, Neuilly sur Seine (FR); Arnaud Hennequin, Suresnes (FR)

(73) Assignee: DASSAULT AVIATION, Paris (FR)

(*) Notice: Subject to any disclaimer, the term of this patent is extended or adjusted under 35 U.S.C. 154(b) by 393 days.

(21) Appl. No.: 14/865,922

(22) Filed: Sep. 25, 2015

(65) Prior Publication Data

US 2016/0094674 A1    Mar. 31, 2016

(30) Foreign Application Priority Data

Sep. 26, 2014   (FR) .................................. 14 02173

(51) Int. Cl.
*H04L 29/08*   (2006.01)
*G06F 8/60*   (2018.01)
*H04B 7/185*   (2006.01)

(52) U.S. Cl.
CPC .......... *H04L 67/2833* (2013.01); *G06F 8/60* (2013.01); *H04B 7/18506* (2013.01); *H04L 67/04* (2013.01); *H04L 67/18* (2013.01)

(58) Field of Classification Search
CPC .............................. H04L 67/2833; G06F 8/60
USPC ........................................................ 709/217
See application file for complete search history.

(56) References Cited

U.S. PATENT DOCUMENTS

| 2007/0127460 A1 | 6/2007 | Wilber |
| 2010/0100887 A1 | 4/2010 | Beltrand |
| 2013/0205384 A1* | 8/2013 | DeBaille ............ H04B 7/18508 726/13 |
| 2014/0075506 A1* | 3/2014 | Davis ..................... H04L 67/12 726/3 |

FOREIGN PATENT DOCUMENTS

| EP | 1 426 870 A2 | 6/2004 |
| EP | 2 063 550 A2 | 5/2009 |

OTHER PUBLICATIONS

Prabhu, Grid and Cluster Computing, Feb. 14, 2008, Chapter 13.3 Excerpt (1 page).*

* cited by examiner

*Primary Examiner* — Wing F Chan
*Assistant Examiner* — Leon Y Tseng
(74) *Attorney, Agent, or Firm* — Davidson, Davidson & Kappel, LLC (57) ABSTRACT

An infrastructure for hosting services in an aircraft, and related access method are provided. The infrastructure includes a plurality of onboard platforms, each platform corresponding to a functional domain of the aircraft and hosting at least one service able to be implemented in the aircraft in the functional domain in question; at least one onboard communicator communicating with a ground structure, connected to each onboard platform; and at least one access portal able to allow centralized access to services hosted by all of the onboard platforms corresponding to the different functional domains of the aircraft.

18 Claims, 8 Drawing Sheets

FIG.7

INFRASTRUCTURE FOR HOSTING SERVICES IN AN AIRCRAFT, AND RELATED ACCESS METHOD The present invention relates to an infrastructure for hosting services in an aircraft, including:
- a plurality of onboard platforms, each platform corresponding to a functional domain of the aircraft and hosting at least one service able to be implemented in the aircraft in the functional domain in question;
- at least one onboard communication module communicating with a ground structure, connected to each onboard platform.

Within the meaning of the present application, a "service" generally refers to a set of software applications able to perform functions within the aircraft, using resources present in the aircraft.

The functional perimeter of the aircraft is distributed in several service domains, which depend on the functionality and the users of the domain.

A first service domain relates to the control of the aircraft, and in particular includes the engine control, flight control, and airplane system control applications.

A second service domain relates to the operator services, and in particular relates to the maintenance of the aircraft and support for the crew in its work during different mission phases. This in particular includes access to various technical and aerial documentation resources available onboard, or on one or more removable pieces of equipment.

A third service domain is relative to passenger well-being during travel. This for example includes controlling hardware resources relative to passenger comfort, passenger entertainment, interactive mobile maps, functions dedicated to the cabin crew, and interface resources with the terminals and devices specific to the occupants of the aircraft.

As a function of the domains, the trust level in terms of security and operating safety varies. The domain relative to aircraft control is highly secure in terms of access and very safe in terms of operation, since a malfunction may be critical during flight. Conversely, the degree of security and safety in the passenger domain is less demanding, inasmuch as any malfunction, although potentially bothersome for passenger comfort, does not constitute a risk for the evolution of the aircraft.

All of the services implemented in the aircraft must be updated regularly, or even during each flight in some cases. It is therefore necessary to access the different domains regularly, onboard and on the ground. The users accessing the various services are quite varied and must be monitored.

BACKGROUND

With the existing infrastructure, such an operating mode is not fully satisfactory. In fact, the resources of the platforms that host the onboard services have characteristics specific to each provider of the corresponding service, for example in terms of the hardware, interface, operating system, software used, etc.

As a result, the maintenance and evolution of services on the aircraft are very complex for the aircraft operator to manage.

For example, content updates are done using procedures specific to each service. The user interfaces are generally not harmonized with one another and depend on the service provider. As a result, modifying the infrastructure to meet the user's need is complex. Each service has its own access and must be documented individually.

Furthermore, the operator does not have visibility on the use of the services, or centralized management of the use of the services, which considerably complicates the operation and the access and update procedures for the services.

SUMMARY OF THE INVENTION

One aim of the invention is therefore to offer an infrastructure simplifying the maintenance and evolution of the onboard services within an aircraft, in particular for the operator.

Another aim of the invention is to meet the user's need by offering greater satisfaction.

To that end, an infrastructure of the aforementioned type is provided, including at least one access portal able to allow centralized access to services hosted by all of the onboard platforms corresponding to the different functional domains of the aircraft.

The infrastructure according to the invention may comprise one or more of the following features, considered alone or according to any technically possible combination:
- at least one access portal is an onboard portal hosted in an onboard platform or at least one access portal is a ground portal hosted in a ground structure.
- for each onboard platform, it includes a security module interposed between each onboard communication module and the onboard platform, the security module being able to manage the security of the data passing between the onboard communication module and the onboard platform.
- at least one security module is connected to two onboard platforms, the security module being able to manage the security of the data passing between the onboard communication module and each platform connected to the security module and data passing between the platforms connected to the security module.
- it includes at least one first onboard communication module with a higher security and/or safety level, and at least one second onboard communication module with a lower security and/or safety level, the infrastructure including at least one first security module with a higher security and/or safety level, connected to the first communication module and to at least one onboard platform, and a second security module with a second lower security and/or safety level, connected to the second onboard communication module and to at least one onboard platform.
- it includes at least one first onboard platform corresponding to a functional domain for aircraft control services, at least one second onboard platform corresponding to a functional domain for operator services, and at least one third onboard platform corresponding to a functional domain for passenger services.
- each onboard platform includes resources able to host at least one service of the functional domain, at least one onboard platform being able to host at least one centralized access portal for access to each service of each platform.
- the resources host a first operating system, and at least one first software application for a first service, able to be executed using the first operating system, the resources comprising at least one intermediate software layer, advantageously of the virtualization type, hosting at least one second software application for a second service, native to a second operating system different from the first operating system, the resources being able to execute the second software application by using the intermediate software layer.

each onboard platform includes at least one functional system and/or a peripheral distinct from the resources, the centralized access portal being able to access software applications hosted by the functional system and/or the peripheral.

the centralized access portal is able to ensure an interconnection and/or synchronization of the onboard services with corresponding services in a ground structure.

the centralized access portal is able to ensure an interconnection and/or synchronization by means of a wireless interface with an onboard personal electronic device.

the resources include at least one module chosen from among a processing module advantageously having an intermediate software layer, a memory and/or data storage module, a graphics module, a data server module, an input-output interface module with at least one functional system and/or one peripheral of the functional domain, a network switching module, advantageously connected to a security module, and an interface module with a personal electronic device.

the resources are at least partially duplicated as a function of the quantity of data to be hosted and/or to guarantee redundancy of the resources so as to ensure their availability, even in case of breakdown.

the centralized access portal includes at least one access management application, able to direct a user to the services associated with a given domain, based on a predefined user type;

the access portal is able to interconnect and/or synchronize the hosted services in the onboard platform of a domain with corresponding grounds services.

A method for accessing services is also provided, including the following steps:

providing an infrastructure as defined above;

using the centralized access portal to access at least one first service hosted by a first onboard platform corresponding to a first functional domain of the aircraft;

using the same centralized portal to access at least one second service hosted by a second onboard platform corresponding to a second functional domain of the aircraft.

BRIEF SUMMARY OF THE DRAWINGS

The invention will be better understood upon reading the following description, provided solely as an example and done in reference to the appended drawings, in which.

DETAILED DESCRIPTION

Figure 1:
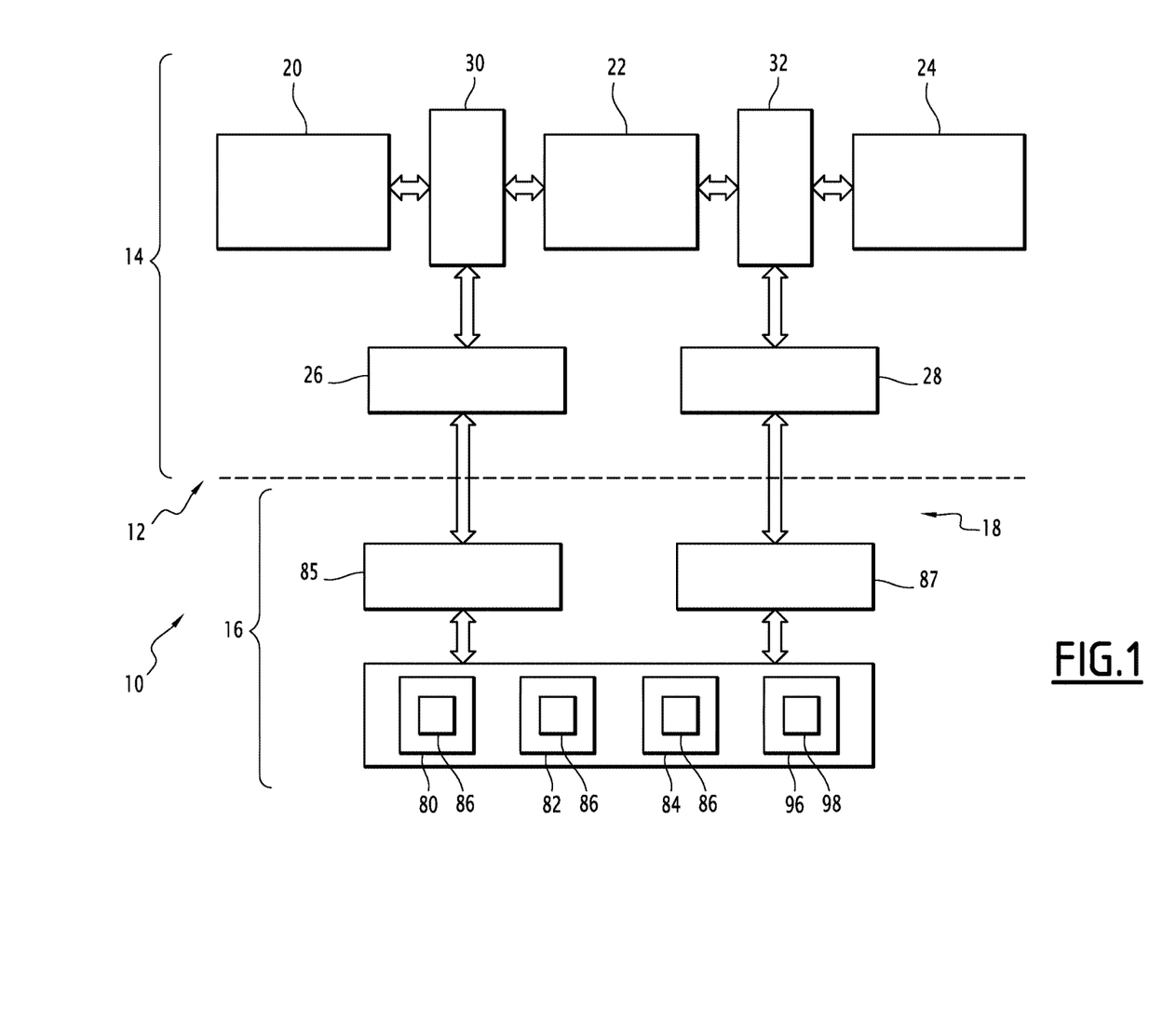
FIG. 1 is a diagrammatic view of a first infrastructure according to an embodiment of the invention.

A first infrastructure 10 for hosting services in an aircraft 12 according to the invention is illustrated by FIG. 1.

The infrastructure 10 includes an onboard structure 14 and a ground structure 16. It includes a communication assembly 18 between the onboard structure 14 and the ground structure 16.

The onboard structure 14 is continuously carried by the aircraft 12. It is designed to be lodged in the aircraft 12 in flight and on the ground. It meets the certification requirements of the aircraft 12.

The onboard structure 14 includes a plurality of platforms 20 to 24 each corresponding to a functional service domain. It further includes at least one onboard communication module 26, 28 for communicating with the ground, and at least one security module 30, 32 for data passing between each onboard communication module 26, 28 and a platform 20 to 24 connected to the module 26, 28 and/or data passing between the platforms 20 to 24.

Each platform 20 to 24 corresponds to a functional domain, with predefined security and safety in the aircraft 12. It hosts the services corresponding to that functional domain. Each functional domain is defined such that the corresponding services have a homogenous security and safety level.

In the example shown in FIG. 1, the infrastructure 10 includes an aircraft control service platform 20, an operator service platform 22, and a passenger service platform 24, respectively corresponding to the aircraft control service, operator service and passenger service domains.

The services hosted by the platform 20 for example correspond to the flight control, engine control, airplane system and/or avionics services. The degree of security and safety of these services may reach the maximum level.

The services hosted by the platform 22 for example include services for managing maintenance and breakdowns, cabin management services, operational function services, for example comprising map and estimated takeoff and landing databases, and/or mission preparation and management services.

The degree of security and safety of these services is lower than that of the services hosted by the aircraft control service platform 20, but is higher than that of the services hosted by the passenger service platform 24.

The services hosted by the platform 24 for example comprise multimedia dashboard services, such as video or audio data protection services, passenger Internet services, onboard communication network access services, and interface services with personal electronic devices 38 that are advantageously portable, such as mobile telephones, tablets, laptop computers, etc.

Figure 2:
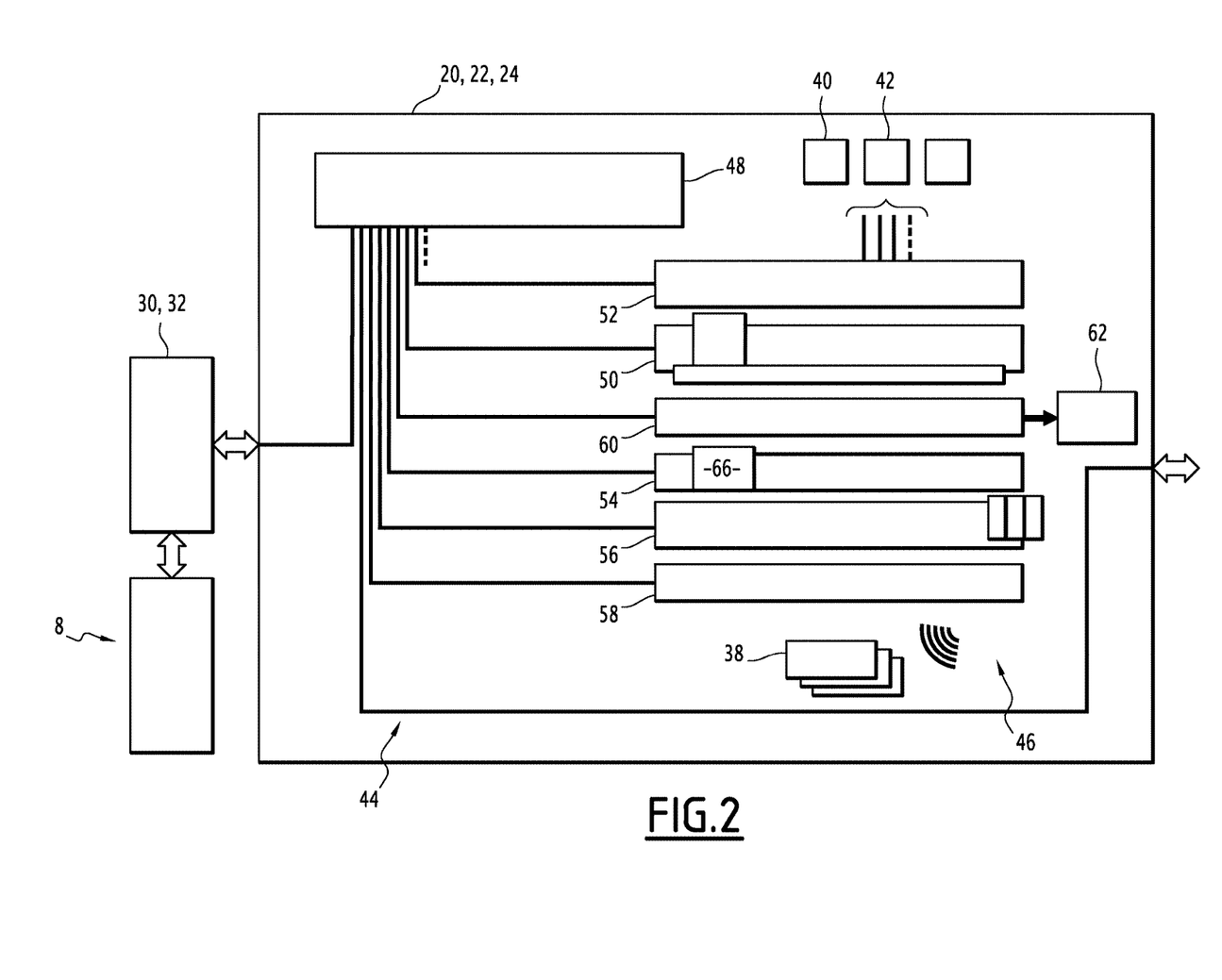
FIG. 2 is a diagrammatic view of an example architecture of an onboard platform corresponding to a functional domain in the first infrastructure according to an embodiment of invention.

In reference to FIG. 2, each platform 20 to 24 is organized in a segregated manner with respect to the other platforms 20 to 24. It advantageously comprises at least one existing functional system 40, such as a maintenance management system or a passenger cabin management system and/or at least one peripheral 42, such as a breakdown information storage unit and means for interfacing with the computers of the airplane systems, such as a lighting or conditioning system.

According to the invention, the platform 20 to 24 further includes a data network 44, specific to the platform 20 to 24, and resources 46 adapted to each domain to cover all of the needs of the domain in terms of processing, memory, and interface with the functional systems 40 and the peripherals 42 of the domain, and with the other platforms 20 to 24.

In addition to the security protection provided by the modules 30 and 32 on the periphery of the traditional domain, the platform optionally includes at least one intra-domain hardware or software security module (not shown). The communication modules 26 and 28 also include additional security protection.

The resources 46 are advantageously modular and for example include at least one module chosen from among a network switching module 48, a processing module 50 and/or an input-output interface module 52. Depending on the needs, it advantageously includes a server module 54, a memory/data storage module 56, an interface module 58 with users' electronic devices 38 and/or a graphics module 60, connected to at least one screen 62.

Alternatively, instead of having a module dedicated to each type of resources, a module may have different resource types, for example a single module may meet processing, memory storage and/or interface needs.

These resources can be partially or completely duplicated as a function of the quantity of data to be hosted and/or to guarantee redundancy of the resources in order to ensure their availability, even in case of breakdown. For example, at least one module 50 to 60 can be duplicated.

The processing module 50 for example includes a memory and a processor able to implement software applications of a service 64, for example associated with an existing system 40 or a peripheral 42 using a first operating system loaded in the processing module 50.

According to the invention, the processing module 50 advantageously includes an intermediate software layer, of the "virtual machine" type, to implement native applications of operating systems different from the first operating system, using the same processing module 50.

"Virtual machine" refers to a software layer simulating the presence of computing, memory, storage and network access resources for an operating system. For the operating system run on a virtual machine, everything happens as if it were being run on the physical machine for which it was initially designed.

The network switching module 48 is able to manage the data transfers between the modules of the platform 20 to 24, the functional systems 40 and/or the peripherals 42 of the platform 20 to 24 and/or with the other platforms 20 to 24 by means of the security modules 30, 32.

The input-output interface module 52 is able to generate the interfaces for data transmitted between the resources 46 and the existing systems 40 and/or the peripherals 42.

The data server module 54 is able to host an onboard portal 66.

The memory/data storage module 56 is able to host and store data necessary for the implementation of the applications of each service, for example video data or audio data, and/or users' personal data.

The interface module 58 is able to implement a communication, preferably wireless, with personal electronic devices 38. The wireless communication is for example a communication operating under standard IEEE 802.11 (Wi-Fi), standard 802.15.1 (Zigbee) or standard IEEE 802.15.4.

The graphic module 60 is able to control the display on at least one screen 62, for example based on applications implemented by the processing module 50.

The resources 46 are able to host software applications of the existing systems 40 and peripherals 42, and software applications, whether specific or new, optionally by means of the intermediate software layer, in the form of a virtual machine.

Figure 5:
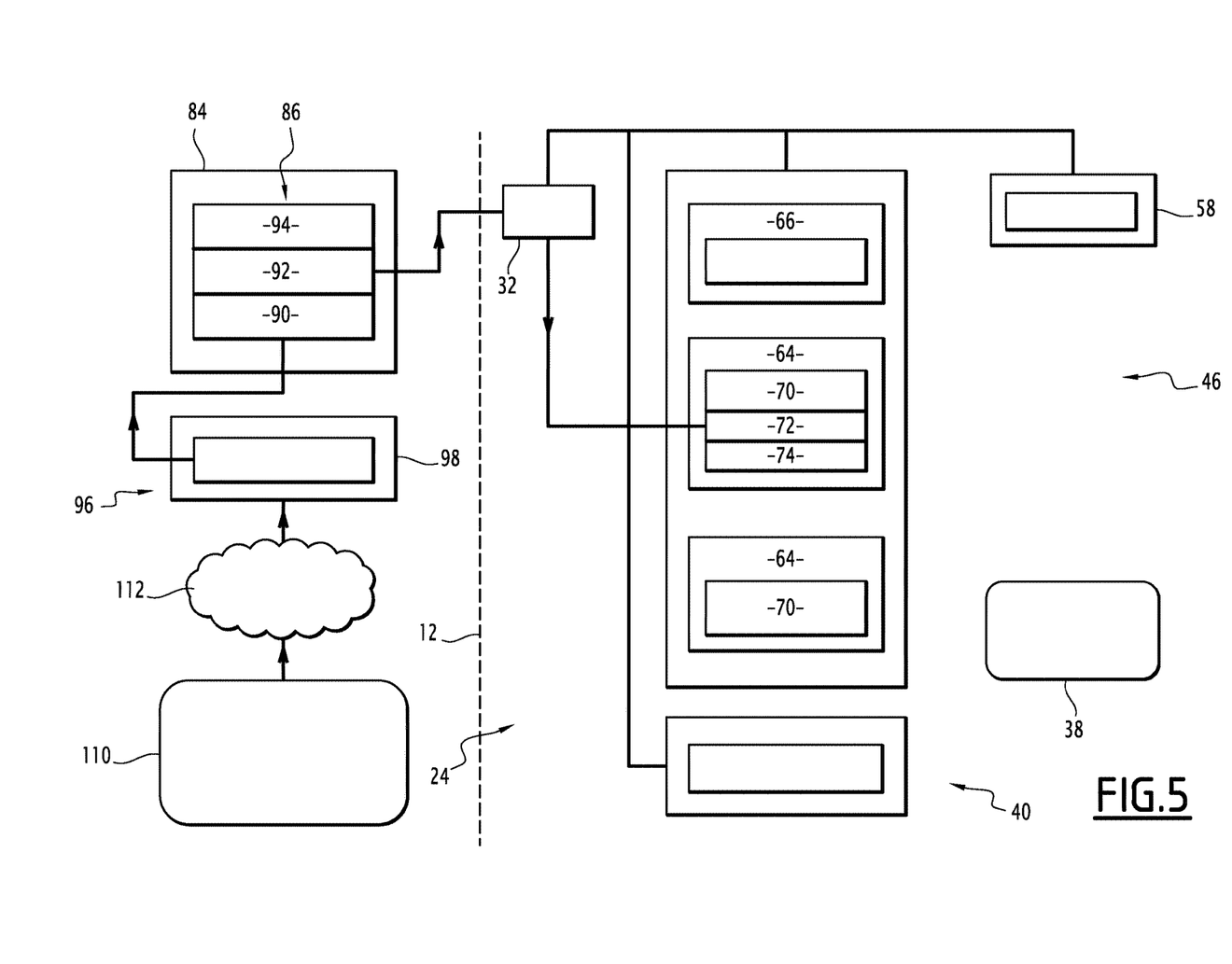
FIGS. 5 to 8 are diagrammatic views illustrating the implementation of methods for accessing services using an infrastructure according to an embodiment of the invention.

For example, in reference to FIG. 5, the virtual machine corresponding to each service 64 includes at least one software application 70 able to be executed during the implementation of the service 64, content 72, such as data, able to be used by the software application(s) 70, and optionally an application 74 that can be manipulated by a web portal.

The resources 46 of at least one platform 20 to 24, advantageously the platform 22, are further able to host at least one onboard portal 66 for centralized access to the set of platforms 20 to 24, and to the set of corresponding services of the ground structure 16.

The onboard portal 66 is for example implemented in the form of a virtual machine, shown in FIG. 5, as will be described below.

In the example shown in FIG. 1, the onboard structure 14 includes two parallel communication modules 26, 28, each connected to a respective security module 30, 32.

The first module 26 has a higher security and safety level, to receive data of the "approved" type from the ground structure 16 and to send data of that type to the ground structure 16. The second module 28 has a lower security and safety level, to receive data of the "unapproved" type from the ground structure 16 and to send data of that type to the ground structure 16.

The first security module 30 has a higher security and safety level, corresponding to the security and/or safety level of the data received from the first module 26 and sent to the latter. It is connected to the aircraft control platform 20 on the one hand, and the operator service platform 22 on the other hand.

It is able to manage the security of data of the "approved" type passing between the first module 26 and each platform 20, 22, and between the platforms 20, 22.

The first security module 30 is not connected to the passenger service platform 24.

The second module 32 has a lower security and safety level, corresponding to the security and/or safety level of data received from and sent to the second module 28. It is connected to the operator service platform 22 on the one hand, and the passenger service platform 24 on the other hand.

It is able to manage the security of data of the "unapproved" type passing between the second module 28 and each platform 22, 24, and between the platforms 22, 24.

The second security module 32 is not directly connected to the aircraft control platform 20.

The ground structure 16 includes a plurality of platforms 80 to 84 each hosting at least one ground service 86 corresponding to an onboard service 64 in one of the platforms 20 to 24.

The ground structure 16 further includes, for each onboard communication module 26, 28, a corresponding ground communication module 85, 87.

Unlike the onboard structure 14, the ground structure 16 can comprise distinct platforms 80 to 84 managed by the operator of the aircraft 12 and/or by service providers independent of the operator of the aircraft 12, without the platforms 80 to 84 necessarily being grouped together in functional domains, as in the onboard structure 14.

The ground structure 16 includes the security resources to perform functions such as encryption, authentication or verification of the integrity of the data, on the same principle as certain security functions performed by the security modules 30 and 32 at the borders of the functional domains, by the intra-domain security components and by the communication modules 26 and 28.

The ground services 86 are able to update applications or software data for the corresponding onboard services 64, update onboard content, necessary to implement the onboard services 64, and/or to configure onboard services 64, if applicable with predefined user preferences.

The ground services 86 are also able to recover data produced and/or stored by the onboard services 64, in particular usage data for the services 64.

For example, for the aircraft control service domain, the ground services comprise applications for updating software and database applications, for example for engine control, flight controls, or aircraft system control.

For the operator service domain, the ground services comprise applications relative to maintenance, in particular the recovery of breakdown information, assistance with breakdown diagnosis, repairs, then verifications after repairs.

Furthermore, the ground services of the operator service domain comprise support applications for the cockpit crew in its work during the different phases of the mission, by means of applications, databases, electronic documentation, or recordings, which can be loaded from the ground structure 16 toward the onboard structure 14 or from the onboard structure 14 toward the ground structure 16.

For the passenger service domain, the ground services also include applications for updating hardware resource, entertainment, mobile map, cabin crew-specific and personal electronic device 38 interface resource applications. The ground services further include content able to be used by the onboard service applications, in particular display data, audio data or video data.

In the example shown in FIG. 5, the ground service 86 housed by the platform 84 includes a programming interface 90, content 92 in the form of audio and/or video data, and optionally a user interface 94 specific to that service.

The first graphic communication module 85 has a higher security and safety level. It is connected to the first onboard communication module 26 by means of the communication assembly 18 for transferring data of the "approved" type between the ground structure 14 and the onboard structure 16.

The second ground communication module 87 has a lower security and safety level. It is connected to the second onboard communication module 28 by means of the communication assembly 18 to transfer data of the "unapproved" type between the ground structure 14 and the onboard structure 16.

The communication assembly 18 for example include air-air, air-ground, ground-ground data links, for example a link via an airport network, a link via an air-ground broadband network as a function of the location of the aircraft 12.

According to the invention, the ground structure 16 includes at least one platform 96 hosting a ground portal 98 for centralized access to the onboard systems 64 of the onboard platforms 20 to 24, and the corresponding services 86 on the ground.

Figure 3:
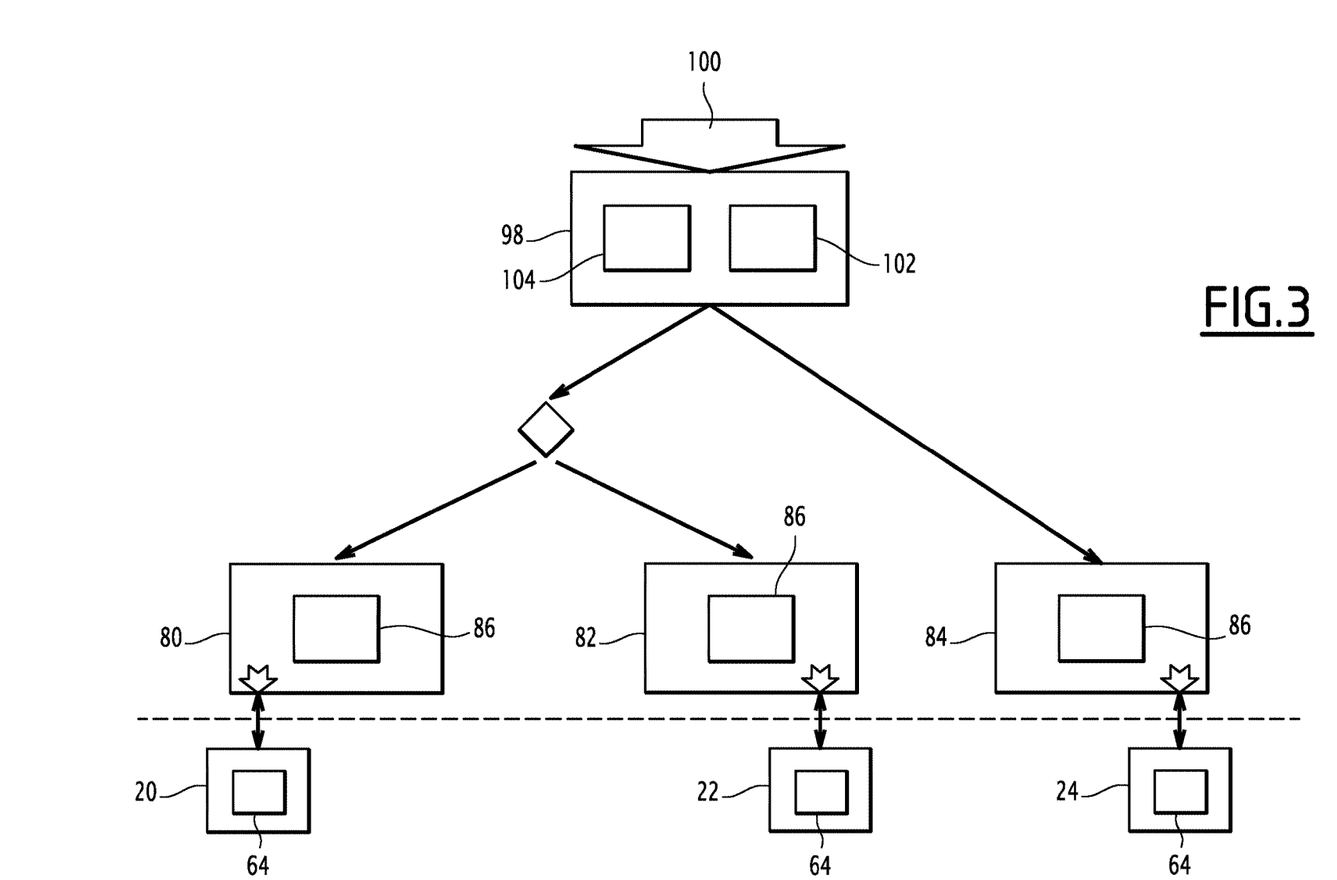
FIG. 3 is a diagrammatic view of the operation of a centralized access portal on the ground, implemented in the infrastructure according to an embodiment of the invention.

In reference to FIG. 3, the ground portal 98 is able to allow a user to access, in a centralized manner, the different onboard services 64 hosted in the platforms 20 to 24 of the onboard structure 14 and the various ground services 86 corresponding to the onboard services 64.

It includes at least one application 100 for user type identification and access management, and advantageously an application 102 for helping guide the user. It includes an interconnection and data synchronization application 104 between each onboard platform 20 to 24 and the corresponding ground platform 80 to 84.

The application 100 is able to identify the type of user connecting to the portal 98 and to allow or prohibit access by the user to a given platform 20 to 24 and 80 to 84 as a function of the user type.

The user type is for example chosen from among passenger, ground operator and flight operator in the cockpit or cabin.

When the application 100 recognizes a user of the passenger type, it is able to prohibit access by that user to the onboard platforms 20, 22, and the corresponding ground platforms 80, 82, and to allow the user to access only the onboard platform 24 and the corresponding ground platform 84.

When the application 100 recognizes a user of the flight operator type, it is able to allow that user to access the onboard platforms 22, 24 and the corresponding ground platforms 82, 84, and to prohibit access by the user to the onboard platform 20 and the corresponding ground platform 80.

When the application 100 recognizes a user of the ground operator type, it authorizes that user to access all of the platforms 20 to 24 and 80 to 84.

As a function of the authorizations given by the application 100, the application 104 is able to establish a link between the platforms 20, 80, between the platforms 22, 82, and between the platform 24, 84, respectively, by means of the communication modules 85, 26 when the security and safety level is higher, and by means of the communication modules 87, 28 when the security level is lower.

The application 104 is thus able to allow the loading of applications associated with each onboard service 64 from a ground platform 80, 82, 84 into an onboard platform 20, 22, 24. The application is loaded, either in a system 40 and/or in an existing peripheral 42, or in the resources 46, for example using a virtual machine.

The application 104 is further able to load data intended for the services 64 available on the onboard platforms 20, 22, 24 from data available in the ground platforms 80, 82, 84, those data being able to be manuals, mission data, such as maps or weather data, or user data, such as user entertainment content, audio and video data.

The application 104 is further able to recover data produced or stored in the onboard platforms 20, 22, 24 to allow usage monitoring. The recovered data are for example breakdown words, system operating data recordings, configurations associated with the aircraft systems 12, or usage statistics.

The application 104 is further able to offer access to the applications and maintenance and mission management documentation hosted in the ground platforms 80, 82, 84.

Figure 4:
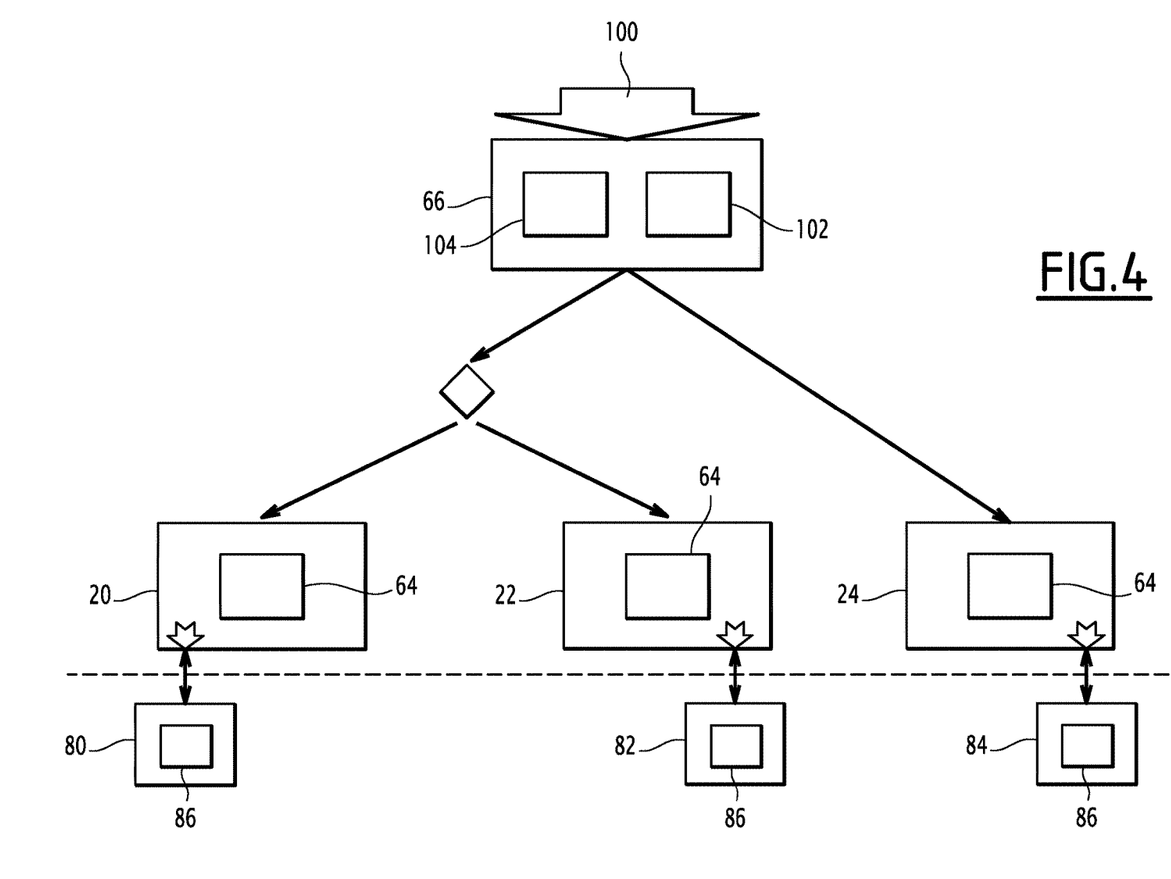
FIG. 4 is a view similar to FIG. 3, illustrating an onboard centralized access portal, implementing the infrastructure according to an embodiment of the invention.

In reference to FIG. 4, the onboard centralized portal 66 operates similarly to the ground centralized portal 98. It also includes at least one application 100 for identifying the user type and managing access, advantageously an application 102 for assisting the user through guidance, and an application 104 for interconnection and data synchronizations between each onboard platform 20 to 24 and the corresponding ground platform 80 to 84.

It is preferably hosted by the resources 46 of the platform 22.

Aside from the functionalities previously described, the application 104 of the onboard portal 66 is able to recover software applications stored in the systems 40 and/or the peripherals 42 and/or the resources 46 to install them in a personal electronic device 38, so as to afford the user the possibility of commanding or interacting with at least one functional system 40 of the aircraft from the personal electronic device 38.

A first example of a method for accessing services according to the invention, using the infrastructure 10, will now be described.

In this example, before a flight, the content of an in-flight entertainment system is updated by a ground operator or a passenger. As illustrated in FIG. 5, the user connects to the centralized ground portal 98 using a terminal 110, for example a portable terminal, through a communication network 112, for example an Internet network.

The identification application 100 is implemented by the user, who identifies himself as a ground operator or passenger. As illustrated by FIG. 3, this gives him access to a ground platform 82 hosting an in-flight entertainment service 86.

In reference to FIG. 5, the interconnection application 104 of the portal ensures the connection to the ground service 86 by means of a programming interface 90 and connects in real-time or deferred time to the ground platform 82 with the onboard platform 22 by means of the ground communication module 87, the communication assembly 18, the onboard communication module 28 and the security module 32.

The onboard service 64 here assumes the form of a virtual machine hosted by the resources 46 of the platform 22. A synchronization of the content 92 of the service 86 on the ground and the content 72 of the onboard service 64 is then done, based on the selection made by the user.

Using the same portal 98, a ground operator can also update services hosted by the platform 20 or by the platform 22, without having to have specific interfaces, or particular software and/or hardware means.

The centralized portal 98, combined with the infrastructure 10 according to the invention, greatly simplifies access to the services present in the aircraft 12, while avoiding the need to have several interfaces specific to each system of the aircraft 12, using a shared interface, floated and delocalized, allowing a user with the appropriate permissions to access each of the services of all of the onboard platforms 20 to 24.

The infrastructure 10 is therefore easy use, and respects the security, safety constraints individually applying to the different domains of the aircraft 12.

Another example embodiment of the access method using the infrastructure 10 according to the invention will now be described, in light of FIGS. 6 to 8.

In this example, the user is a passenger present onboard the aircraft 12. The user has a personal electronic device 38, such as a mobile telephone, a tablet, or a laptop computer.

The method allows the user to implement cabin environment management applications, for example to control the light or temperature at his seat.

Figure 6:
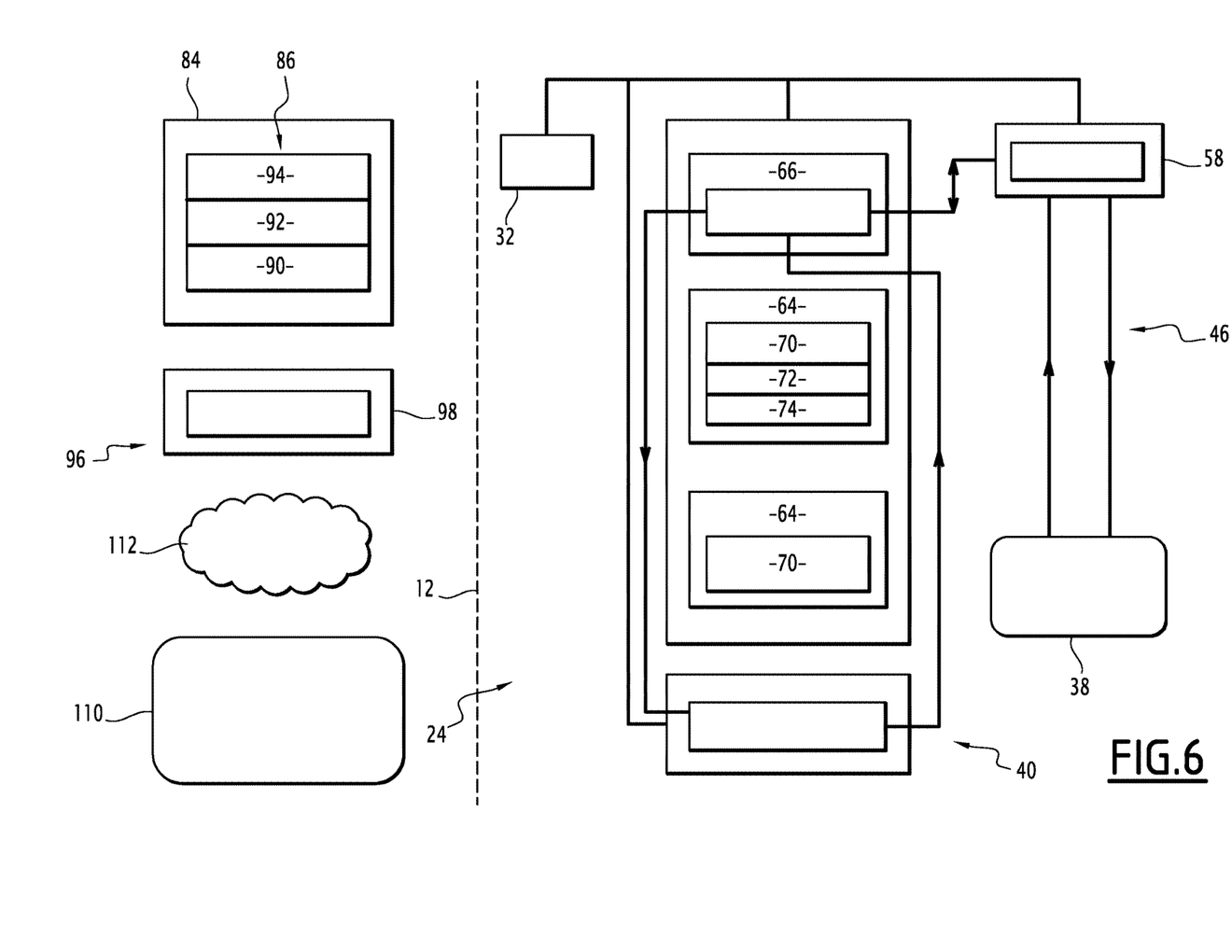

In a first step of the method, illustrated by FIG. 6, a data link is established between the personal electronic device 38 and the passenger service platform 24, advantageously by means of the interface module 58 and a wireless link, in particular of the Wi-Fi or Bluetooth type.

During the connection, the interface module 58 activates the onboard portal 66. The latter identifies the passenger by means of the application 100 and accesses the storage memory for the applications hosted by a functional system 40 of the platform 24, here the cabin environment management system, by means of the application 104.

Next, the application 104 loads at least one control application hosted in the functional system 40 into the memory of the personal electronic device 38.

The user can then implement the control application, for example using a man-machine interface on his personal electronic device 38.

Figure 7:
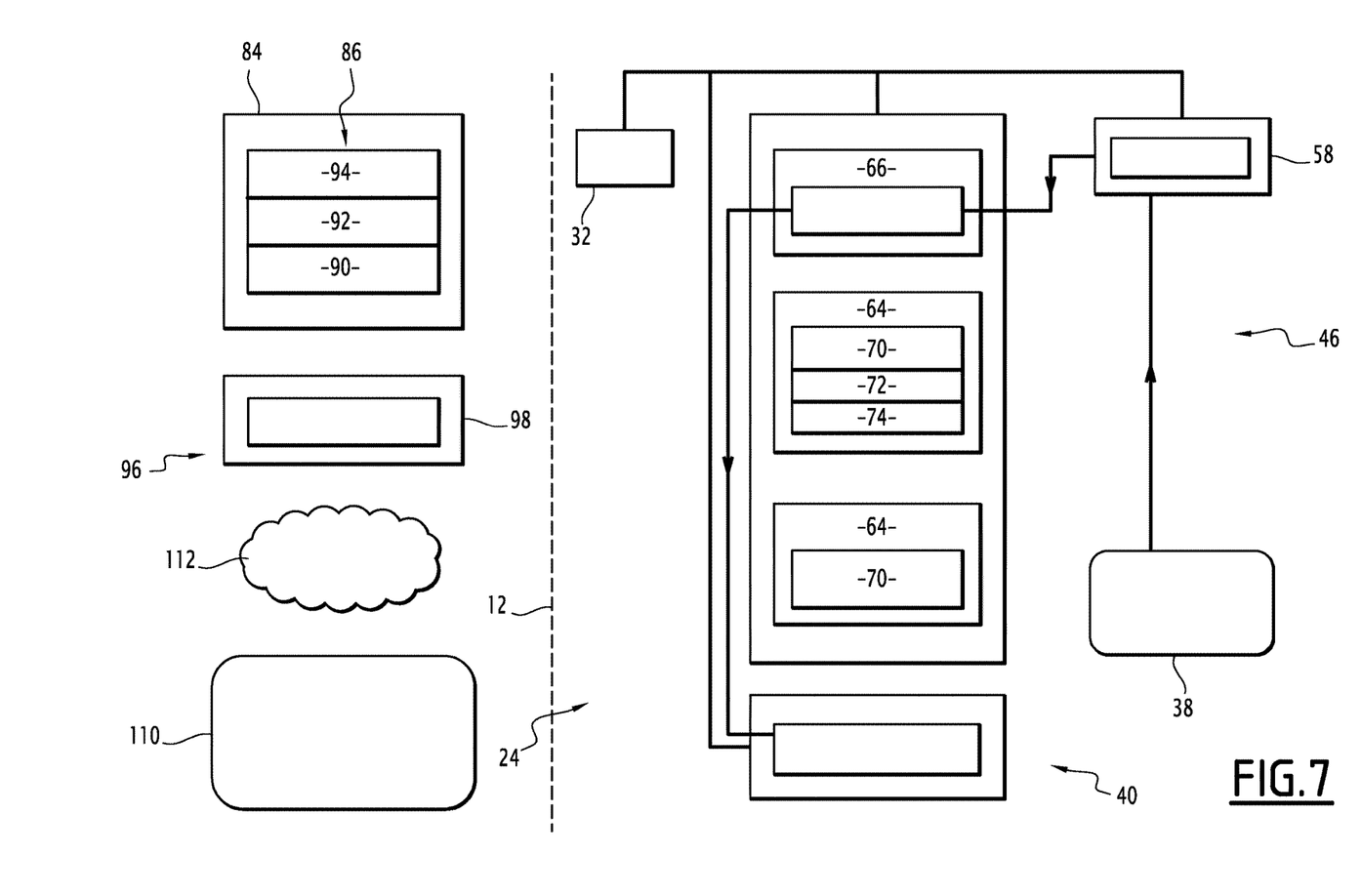

The personal electronic device 38 connects to the functional system 40 by means of the onboard portal 66 and drives the system 40, as illustrated by FIG. 7.

Figure 8:
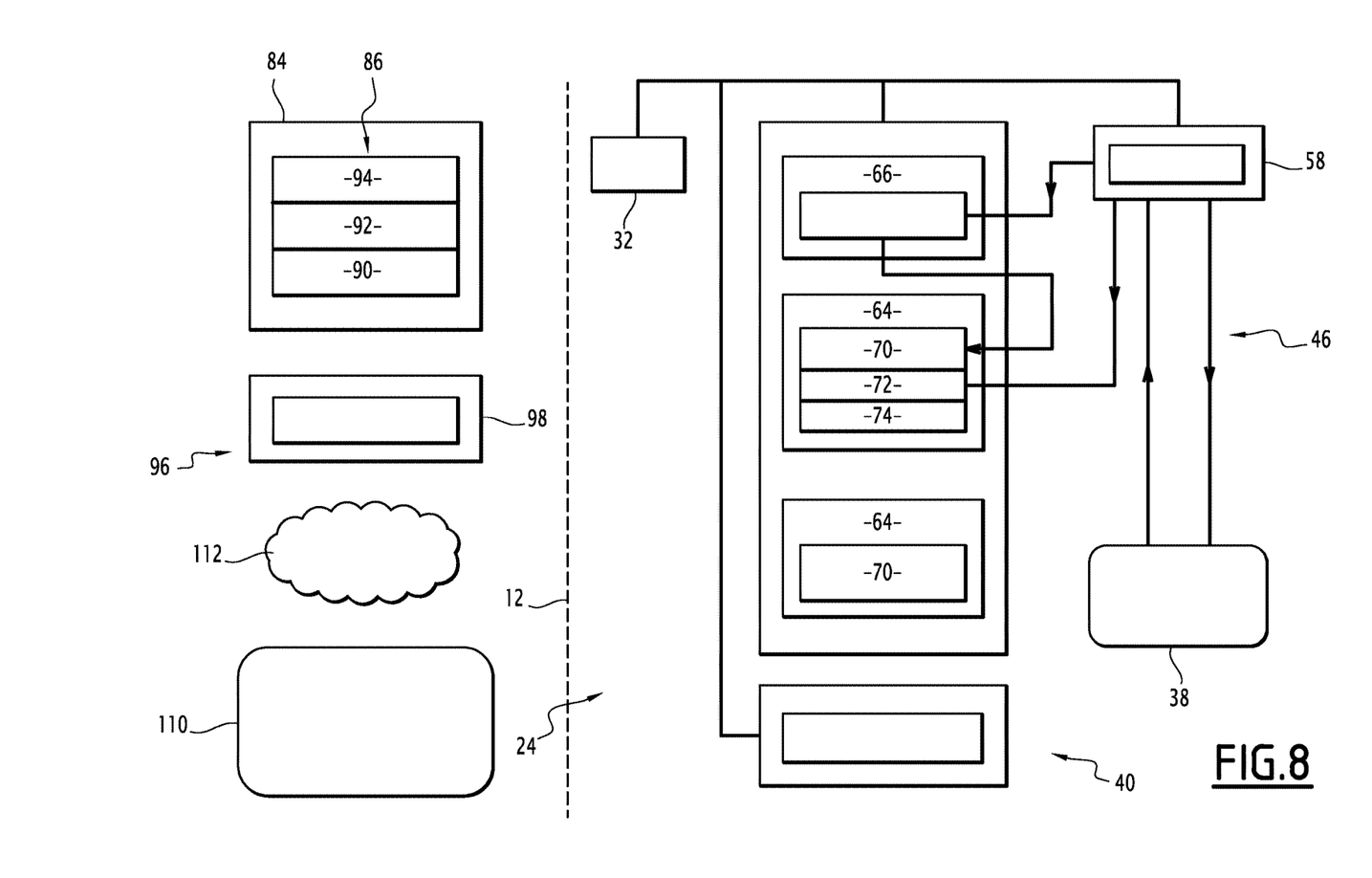

Likewise, as illustrated by FIG. 8, the user can access the in-flight entertainment service 64 by means of the onboard portal 66, to download an application for driving that service 64, then to implement the application.

In one alternative, if the user wishes to access content hosted by a platform on the ground 80 to 84, he can also connect to the ground platform 80 to 84 onboard the aircraft 12, by means of the same onboard portal 66, without it being necessary to use a specific portal.

This for example allows a pilot of the aircraft to access an aerial map database service on the ground, to load data into the platform 22 that is necessary to perform the mission, using the onboard portal 66.

This change can be made on the ground or in flight.

The infrastructure 10 according to the invention therefore gives an occupant of an aircraft 12 very easy and secure access to various onboard services, as well as real-time or deferred access to the corresponding ground services using a centralized onboard portal 66.

The infrastructure 10 authorizes the implementation of the existing services, which are implemented using functional systems 40 and/or peripherals 42 existing on the aircraft 12. It also allows the implementation of new services that are not necessarily native to the operating system existing in the aircraft, to adapt easily to the aircraft user's needs.

In one alternative, the synchronization of each surface 64 can also be done directly by the corresponding service 64, without going through the onboard portal 66.

In that case, the infrastructure 10 may not have an onboard portal 66, and comprise only a ground portal 98.

What is claimed is:

1. An infrastructure for hosting services onboard an aircraft including:
    a plurality of onboard platforms, the onboard platforms including at least one first onboard platform corresponding to a functional domain for aircraft control services, at least one second onboard platform corresponding to a functional domain for operator services, and at least one third onboard platform corresponding to a functional domain for passenger services, each platform including a memory and a processor configured to control the platform via instructions from the memory to host at least one service configured to be implemented in the aircraft in the functional domain;
    at least one onboard communicator configured to communicate with a ground structure, the at least one onboard communicator connected to each onboard platform;
    at least one first security module, connected to the at least one onboard communicator, to the at least one first onboard platform corresponding to a functional domain for aircraft control services, and to the at least one second onboard platform corresponding to a functional domain for operator services, without being connected to the at least one third onboard platform corresponding to a functional domain for passenger services;
    at least one second security module, connected to the at least one onboard communicator, to the at least one second onboard platform corresponding to a functional domain for operator services, and to the at least one third onboard platform corresponding to a functional domain for passenger services, without being directly connected to the at least one first onboard platform corresponding to a functional domain for aircraft control services; and at least one centralized access portal including a memory and a processor configured to control the portal via instructions from the memory to allow a user centralized access to services hosted by all of the onboard platforms corresponding to the different functional domains of the aircraft.

2. The infrastructure as recited in claim 1 wherein the at least one centralized access portal is an onboard portal hosted in an onboard platform or the at least one centralized access portal is a ground portal hosted in a ground structure.

3. The infrastructure as recited in claim 1 wherein each security module is configured to manage the security of the data passing between the onboard communicator and each platform connected to the security module and data passing between the platforms connected to the security module.

4. The infrastructure as recited in claim 1 wherein the at least one onboard communicator includes at least one first onboard communicator with a higher security and/or safety level, and at least one second onboard communicator with a lower security and/or safety level, the at least one security module being connected to the first onboard communicator and to at least one of the onboard platforms, and a second security module being connected to the second onboard communicator and to at least one of the onboard platforms.

5. The infrastructure as recited in claim 1 wherein each onboard platform includes resources configured to host the at least one service of the functional domain, at least one of the onboard platforms being configured to host the at least one centralized access portal for access to each service of each platform.

6. The infrastructure as recited in claim 5 wherein the resources host a first operating system, and at least one first software application for a first of the services, the at least one first software application configured to be executed using the first operating system, the resources comprising at least one intermediate software layer hosting at least one second software application for a second of the services, the at least one second software application being native to a second operating system different from the first operating system, the resources being configured to execute the second software application by using the intermediate software layer.

7. The infrastructure as recited in claim 6 wherein the at least one intermediate software layer is of the virtualization type.

8. The infrastructure as recited in claim 5 wherein each onboard platform includes at least one functional system and/or a peripheral distinct from the resources, the centralized access portal being configured to access software applications hosted by the functional system and/or the peripheral.

9. The infrastructure as recited in claim 5 wherein the centralized access portal is configured to ensure an interconnection and/or synchronization of the onboard services with corresponding services in a ground structure.

10. The infrastructure as recited in claim 5 wherein the centralized access portal is configured to ensure a wireless interface interconnection and/or synchronization with an onboard personal electronic device.

11. The infrastructure as recited in claim 5 wherein the resources include at least one among a processor, a memory and/or data stores, a graphics module, a data server, an input-output interface with at least one functional system and/or one peripheral of the functional domain, a network switcher, and an interface with a personal electronic device.

12. The infrastructure as recited in claim 11 wherein the resources include the processor, the processor having an intermediate software layer.

13. The infrastructure as recited in claim 11 wherein the resources include the network switcher, the network switcher is connected to a security module.

14. The infrastructure as recited in claim 5 wherein the resources are at least partially duplicated as a function of the quantity of data to be hosted and/or to guarantee redundancy of the resources so as to ensure the availability of resources, even in case of breakdown.

15. The infrastructure as recited in claim 1 wherein the at least one centralized access portal includes at least one access management application configured to direct a user to the services associated with a given domain, based on a predefined user type.

16. The infrastructure as recited in claim 1 wherein the at least one centralized access portal is configured to interconnect and/or synchronize the hosted services in the onboard platform of a domain with corresponding ground services.

17. A method for accessing services including:
providing the infrastructure as recited in claim 1;
using the centralized access portal to access at least one first of the services hosted by a first of the onboard platforms corresponding to a first of the functional domains of the aircraft;
using the same centralized portal to access at least one second of the services hosted by a second of the onboard platforms corresponding to a second of the functional domains of the aircraft.

18. The infrastructure as recited in claim 1 wherein the at least one first security module is with a higher security and/or safety level and the at least one second security module is with a second lower security and/or safety level.

* * * * *